United States Patent [19]
Johnson et al.

[11] 4,168,768
[45] Sep. 25, 1979

[54] BRAKING SYSTEM FOR CABLE SPOOLING DRUMS

[75] Inventors: Earl R. Johnson; Lesley G. Watkins, both of Tulsa, Okla.

[73] Assignee: Loffland Brothers, Tulsa, Okla.

[21] Appl. No.: 857,661

[22] Filed: Dec. 5, 1977

[51] Int. Cl.² ............................................. F16D 65/32
[52] U.S. Cl. ............................ 188/204 A; 188/77 R
[58] Field of Search ................ 188/77 R, 110, 204 A, 188/105, 170

[56] References Cited
U.S. PATENT DOCUMENTS

| | | | |
|---|---|---|---|
| 1,711,886 | 5/1929 | Ginter | 188/204 A |
| 1,932,685 | 10/1933 | Black | 188/77 R X |
| 2,282,615 | 5/1942 | Spalding | 188/170 X |
| 2,465,164 | 3/1949 | Maier et al. | 188/77 R |
| 2,489,449 | 11/1949 | Crookston | 188/204 A X |
| 2,569,479 | 10/1951 | Lonngren | 188/170 X |
| 2,928,505 | 3/1960 | Wilson | 188/77 R |

Primary Examiner—Duane A. Reger
Attorney, Agent, or Firm—Head, Johnson & Chafin

[57] ABSTRACT

A hydraulic back-up system for use in combination with an equalizer beam of a drawworks brake system during the drilling of an oil and/or gas well bore for reducing the hazards in the event of failure of the drawworks braking system by automatically locking the equalizer beam in order that a single brake band of a two-brake band system will function for holding the load in an emergency situation.

5 Claims, 2 Drawing Figures

4,168,768

BRAKING SYSTEM FOR CABLE SPOOLING DRUMS

BACKGROUND OF THE INVENTION

1. Field of the Invention

This invention relates to improvements in cable spooling braking systems and more particularly, but not by way of limitation, to an improved back-up system for automatically locking an equalizer beam in a two-brake band drum braking system during failure of one of the brake bands.

2. Description of the Prior Art

The drawbacks utilized at the well site during the drilling of an oil and/or gas well bore normally induces a cable spooling drum having a relatively great length of cable or wire line spooled thereon for use during the drilling operation. These cable spooling drums are usually of a substantially large size in order to receive these great length of cable thereon, and comprise a cable receiving core having circumferential flanges provided at each end thereof for facilitating the spooling and unspooling of the cable and retaining the cable in position on the core. The outer periphery of each drum flange is normally provided with a braking surface, and an independent brake band is usually disposed around the drum flange for engagement with the braking surface to control the speed of rotation of the drum during a cable spooling or unspooling operation. In order to synchronize the operation of the two brake bands, or maintain a substantially equal braking pressure on each of the drum flanges, an equalizer beam is usually operably connected between the brake bands. The equalizer beam is pivotally mounted at a central point along the length thereof, and has the opposite ends secured independently to one end of the brake bands whereby the braking pressure applied to the end of each brake band is substantially equal at all times.

This equalizer beam arrangement frequently results in a send of false security at the drilling site since it is often mistakenly considered that the beam will maintain braking control of the spooling drum upon the failure of one of the brake bands. However, an extremely high leverage ratio is required to enable the brake band (mechanical brake) system to stop and hold enormous loads, and the loss of one band for any reason results in the loss of the mechanical braking system since the linkage cannot accommodate the extra level. Of course, it is the usual practice to provide an auxiliary brake system, but in actual working conditions, it is found that the normal auxiliary brakes will not stop the drill pipe moving downwardly in the well bore, but will merely slow it down. If the main brakes of the drawworks braking system fail, no presently available auxiliary braking system can provide a final stopping of the drill pipe.

SUMMARY OF THE INVENTION

The present invention contemplates a hydraulic back-up system utilized in combination with the usual equalizer beam for overcoming the foregoing disadvantages. The system comprises a pair of hydraulic rams operably for engagement with the equalizer beam for locking the beam in a neutral position upon failure of one of the brake bands. In this manner, the remaining leverage ratio is retained in the remaining brake band for effectively stopping the drill pipe and holding the load, at least for a sufficiently great period of time for the operating or drilling personnel to be alerted for emergency repair of normal emergency handling of the situation. Thus, loss of the drill pipe, and the like, is substantially eliminated, and hazard to the personnel working at the drill site is greatly reduced in the event of brake failure at the drawworks. The novel system comprises a relatively small hydraulic ram positioned under each end of the equalizer beam, and continuously pressured by the normal rig air system always present at a well drilling site. The rams are operably connected with a high pressure shut-off valve, and when the valve is open, cross-flow of the hydraulic fluid permits the normal operation of the equalizer beam whereby the brake band linkage may be adjusted in the normal manner. Subsequent to the adjustment of the linkage, the valve may be closed, and remains closed until such time as the linkage adjustment must be repeated, such as upon wear of the brake band or the like. When the valve is closed, failure of one brake band cannot cause movement of the equalizer beam, and therefore the one remaining brake band remains efficient for topping and holding the load. Of course, it will be apparent that this arrangement eliminates the constant equalization feature of the brake system presently available in the two brake band braking system, but the increased safety and braking security overcomes any additional requirements of a more frequent manual brake linkage adjustment.

However, a modified embodiment of the invention comprises a pair of small hydraulic rams positioned at the opposite ends of the equalizer beam as hereinbefore set forth, but in a normal position out of engagement with the beam. Upon failure of one of the brake bands, the hydraulic system is activated for immediately moving the rams into engagement with the equalizer beam for locking thereof in the manner as hereinbefore set forth whereby the remaining brake band may efficiently stop and hold the load. In this embodiment, the equalizer beam functions in the normal present day manner for providing a constant equalization of the brake system, with the hydraulic back-up system coming into use only upon the failure of one of the brake bands. The novel system is simple and efficient in operation and economical and durable in construction.

DESCRIPTION OF THE PREFERRED EMBODIMENTS

Figure 1:
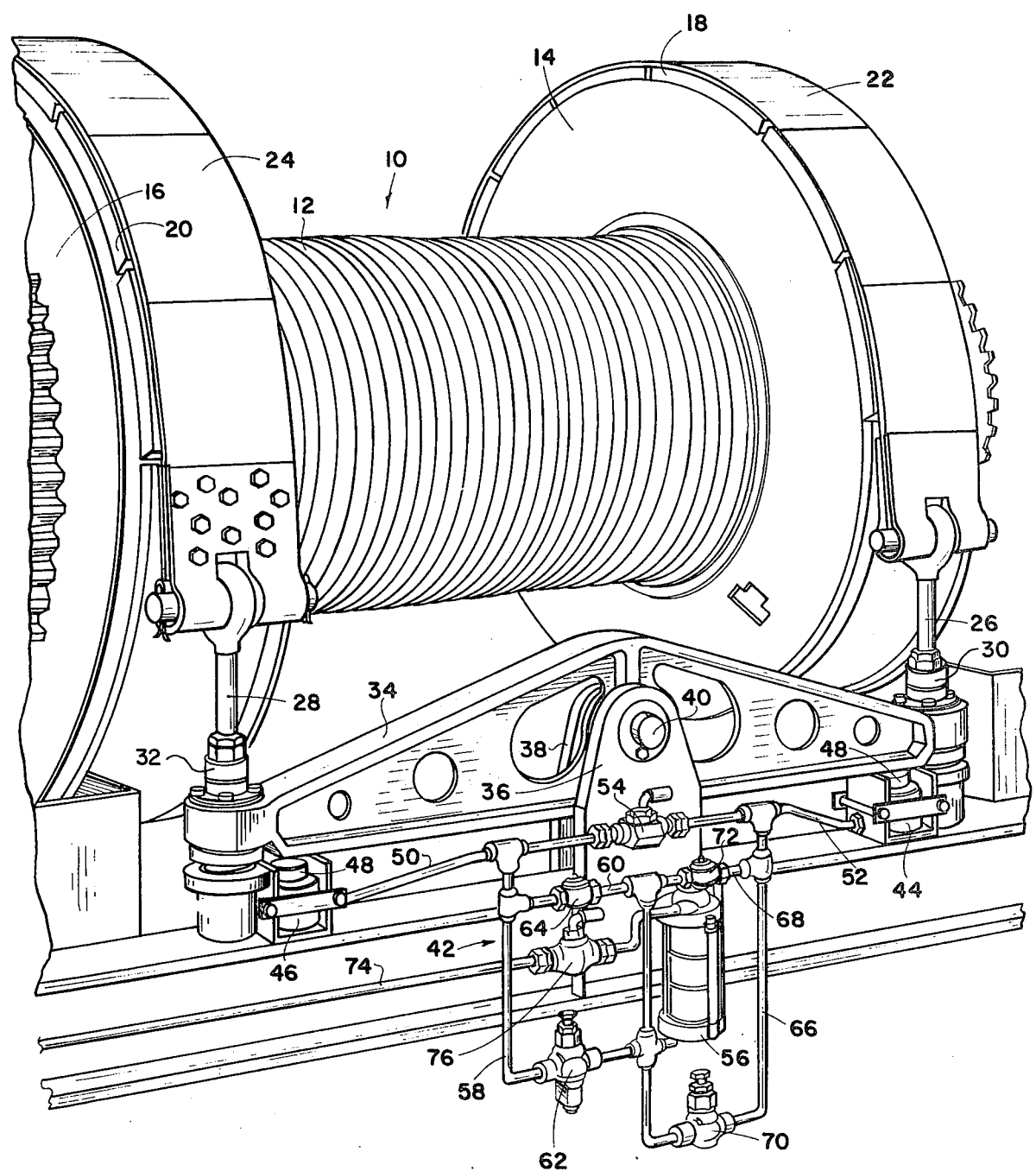
FIG. 1 is a perspective view of a cable spooling drum and brake system of a drawworks having a hydraulic back-up system embodying the invention installed thereon.

Referring to the drawings in detail, and particularly FIG. 1, reference numeral 10 generally indicates a cable spooling drum such as normally provided on a drawworks at the site of a drilling oil and/or gas well bore (not shown). The drum 10 comprises the usual cable receiving core 12 having a pair of substantially identical oppositely disposed drum flanges 14 and 16 as is well known. The outer periphery of each flange 14 and 16 is provided with the usual brake surface or brake shoes 18 and 20, respectively, for cooperation with the usual brake bands 22 and 24, respectively, for controlling the rate of speed of rotation of the drum 10 during a well drilling operation. Each brake band 22 and 24 normally has one end thereof attached to the brake actuating linkage in any suitable or well known manner (not shown), and the brake bands are wrapped around or disposed adjacent the brake shoes 18 and 20 as clearly shown in the drawings. The opposite end of each band 22 and 24 is normally connected with a suitable linkage member 26 and 28, respectively, each of which are operably connected with suitable adjustment members 30 and 32, respectively. The adjustment members 30 and 32 are provided for the selective adjustment of the position of the link members 26 and 28 in order to adjust the braking pressure of the brake bands 22 and 24 against the brake shoes 18 and 20, all as is well known in the industry. In addition, an equalizer beam 34 is usually interposed between the outer ends of the brake bands 22 and 24, and the opposite ends of the beam 34 are suitably connected with the link members 26 and 28 for simultaneous movement therebetween for a purpose and in a manner as will be hereinafter set forth.

The beam 34 is normally supported by a pair of spaced upstanding flanges 36 and 38, and is pivotally secured therebetween at 40 in such a manner that the left hand and right hand ends of the beam 34 are substantially balanced. Thus, in the event the braking pressure of one of the brake bands, such as the band 22, varies from the preset pressure, the beam will pivot about the connection 40 for equalizing the braking pressure between the bands 22 and 24, as is well known in the industry. However, as hereinbefore set forth, in the event of a complete failure of one of the brake bands, such as the band 22, the beam 34 will be completely unbalanced, and there will not be sufficient linkage at the opposite end of the beam for a proper braking pressure application for the brake band 24.

In order to overcome this disadvantage, a hydraulic back-up system, generally indicated at 42, is provided in combination with the equalizer beam 34. The system 42 comprises a pair of substantially identical, relatively small hydraulic rams or cylinders 44 and 46 suitably mounted beneath the opposite ends of the beam 34 and disposed immediately inboard of the adjustment devices 30 and 32. Each cylinder 44 and 46 is provided with a reciprocal ram member 48 which is initially adjusted in such a manner that the outer end of each ram 48 is in engagement with the underside of the beam 34. Of course, it may be desirable to interpose shims (not shown), or the like, between the outer ends of the rams 48 and the beam 34 for assuring an efficient engagement therebetween.

The cylinders 44 and 46 are in hydraulic communication through conduits 50 and 52, and a suitable high pressure shut-off valve 54 is interposed between the lines or conduits 50 and 52 to provide selective fluid communication therebetween for a purpose as will be hereinafter set forth. The cylinder 46 is also in communication with a suitable air-over-oil intensifier 56 through conduits 58 and 60. A suitable relief valve 62, preferably a high pressure relief valve but not limited thereto, is interposed in the line 58 between the cylinder 46 and the intensifier 56, and a suitable check valve 64 is interposed in the conduit 60 between the cylinder 46 and intensifier 56, said check valve 64 permitting a flow of fluid in a direction from the intensifier 56 toward the cylinder 46 and precluding a reverse flow of fluid therethrough. The cylinder 44 is similarly in communication with the intensifier 56 through conduits 66 and 68, and a second relief valve 70 similar to the valve 62 is interposed in the line 66 between the cylinder 44 and the intensifier 56, and a second check valve 72 similar to the valve 64 is interposed in the line 68 between the cylinder 44 and the intensifier 56. The valve 72 permits the flow of fluid from the intensifier 56 to the cylinder 44, but precludes a reverse flow of fluid therethrough. A supply of air pressure is provided for the air-over-oil intensifier 56 through a conduit 74 which is in communication with the normal air supply usually present present at the site of every oil and/or gas well drilling site. It is preferable to interpose a three-way ball valve 76 in the line 74 upstream of the intensifier 56 for facilitating the control of air pressure at the intensifier, as is well known.

The cylinders 44 and 46 are preferably substantially identical and may be of any suitable type, such as those commonly known as Enerpac heavy duty lifting cylinders. In addition, the air-over-oil intensifier 56 may be of any suitable type, such as that known as the Midland Pressure Converter.

In operation, as hereinbefore set forth, the rams 48 are initially adjusted in the usual or well known manner whereby the outer end of each ram is in engagement with the underside of the beam 34. The valve 54 is then opened for providing fluid communication between the cylinders 44 and 46. While the valve 54 is open, a fluid cross flow is provided between the cylinders, and the linkage members 26 and 28 of the brake bands 22 and 24 may be adjusted in the usual manner for establishing the desired braking engagement between the brake bands and respective brake shoes 18 and 20. When this adjustment has been accomplished, the valve 54 may be closed, and the rams 48 are locked in position. Of course, this removes or eliminates the pivotal action of the equalizer beam 34 and in effect removes the beam 34 from the braking system. However, at any time when it is necessary to readjust the braking pressure, the valve 54 may be once again opened to restore the fluid cross flow between the cylinders 44 and 46.

In the event of failure of one brake for any reason, such as the brake 18-22, the braking pressure at the right hand end of the beam 34, as viewed in FIG. 1 will be greatly reduced or substantially eliminated, and normally the unequal pressure on the beam 34 would cause the beam to pivot about the point 40. However, the unequal pressures acting on the beam 34 will not be able to displace or pivot the beam due to the locked-up hydraulic pressure in the cylinder 44. Thus, the linkage 28 of the brake band 22 will be held and the brake 20-24 will function for holding the load, at least through a sufficiently great time period as to permit the drilling personnel to shut down the drawworks for repair or replacement of the damaged braking elements.

Figure 2:
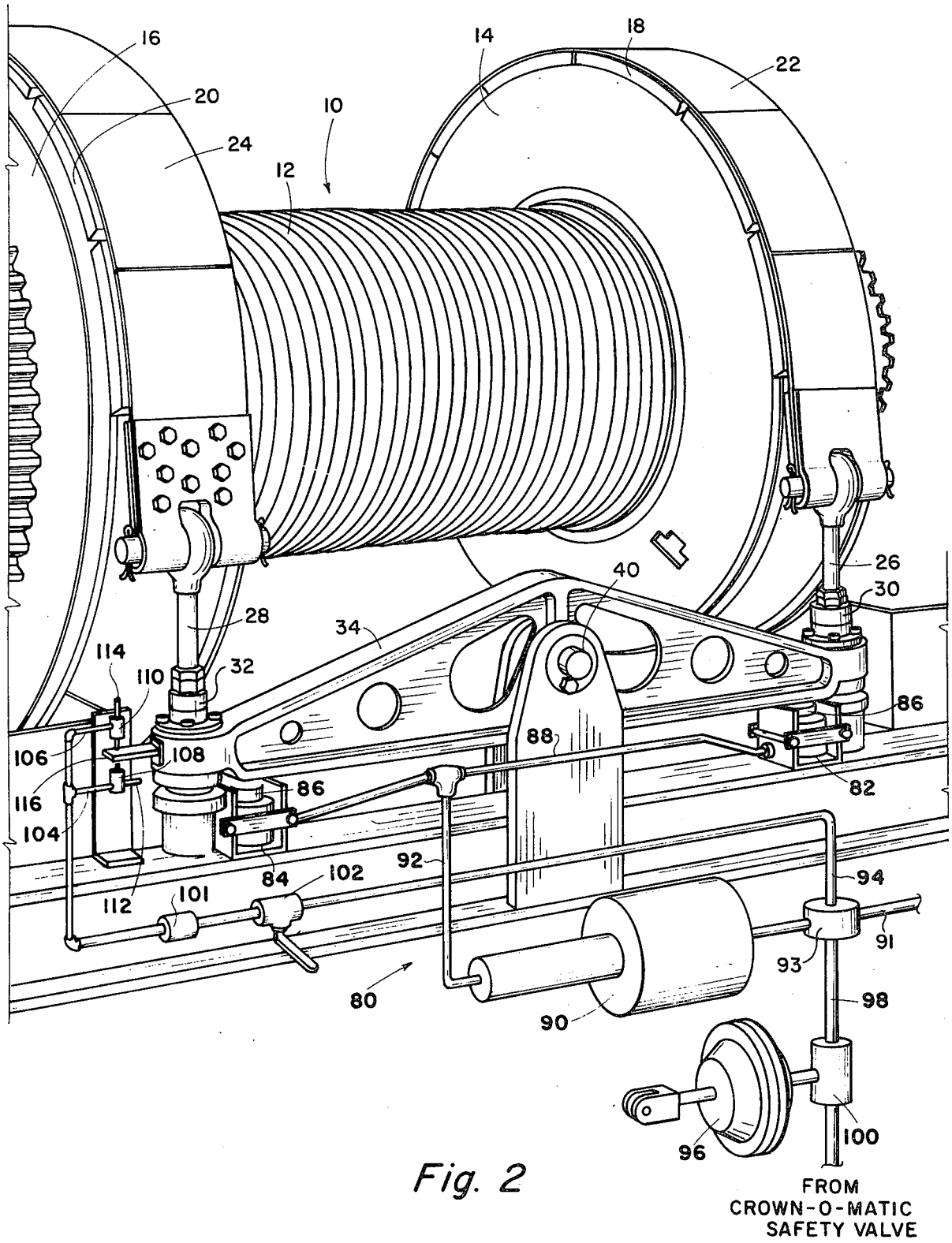
FIG. 2 is a view similar to FIG. 1, depicting a modified back-up system embodying the invention.

Referring now to FIG. 2, a modified hydraulic back-up system is generally indicated at 80 and comprises a pair of hydraulic cylinders 82 and 84 substantially identical with the cylinders 44 and 46. The cylinders 82 and 84 are disposed inboard of the adjustment devices 30 and 32, and each cylinder 82 and 84 is provided with a reciprocal ram member 86. The normal position of each of the ram members 86 is such that the outer end of each ram is slightly spaced from the underside of the beam 34 whereby the beam 34 is free to pivot about the pivot connection 40 is the usual or well known manner for automatically adjusting the braking pressure between the brake bands 22 and 24 as hereinbefore set forth.

The cylinders 82 and 84 are in hydraulic communication through a conduit 88, and the conduit 88 is in communication with a suitable air-over-oil intensifier 90 through a conduit 92. The intensifier 90 is substantially identical to the intensifier 56, and the air side thereof is is communication with the normal air supply (not shown) at the well drilling site through a conduit 91 having a relay valve 93 interposed therein as will be hereinafter set forth. In addition, the air side of the intensifier is in communication with the usual braking chamber 96 of the crown block (such as that known as the Crown-O-Matic brake chamber) through a conduit 98 having a suitable shuttle valve 100 interposed therein. The shuttle valve 100 is also preferably in communication with the usual safety valve (not shown) of the brake chamber 96 in any suitable manner (not shown).

The conduit 94 is provided with a suitable check valve 101 permitting the flow of air in a direction toward the intensifier 90 and a valve 102 is interposed between the valve 101 and intensifier 90 for resetting the back-up system 80. The conduit 94 is also provided with a pair of spaced branch lines 104 and 106, each having a suitable adjustable air pilot valve 108 and 110, respectively in communication therewith. The valve 108 is in communication with the drilling rig air supply through a line or conduit 112, and the valve 110 is similarly in communication with the drilling rig air supply through a conduit 114. An actuator arm 116 is rigidly secured to one end of the beam 34 in the proximity of the valve 108 and 110 and is normally interposed substantially centrally between the two valves, as particularly shown in FIG. 2.

In operation, when the brakes 18-22 and 20-24 are in normal working condition, the rams 86 are maintained out of engagement with the beam 34, and the equalizer beam 34 functions in the usual or well known manner for establishing substantially equal braking pressure for the brake bands 20 and 22. However, upon failure of one of the brakes, such as the brake 18-22, the pressure on the right hand end of the beam 34, as viewed in FIG. 2 is greatly reduced, and the beam 34 will pivot about the connection 40 in a clockwise direction as viewed in the drawings. This will immediately bring the actuator arm 116 into engagement with the pilot valve 110 for actuation thereof to supply air to the conduit 94 and to the air side of the intensifier 90 thru the relay valve 93. The pressure is increased at the intensifier, as is well-known, and increased hydraulic pressure is directed simultaneously to the rams 86. Since the hiatus between the rams 86 and the beam 34 is relatively small, as for example approximately one eighth of an inch, only a slight upward movement of the rams 86 is required for engagement thereof with the beam. As soon as the rams 86 engage the beam, the beam is returned to the neutral position therefor, and the remaining brake band 24 is maintained in an effective and efficient operating position for holding the load, as hereinbefore set forth in connection with the first embodiment of the invention.

At the same time the air is supplied to the intensifier, air pressure is supplied to the crown brake chamber 96, which functions in the normal or usual manner thereof for shutting down the operation of the drawworks until the drilling personnel can repair the damaged brake elements. Of course, the crown brake chamber 96 and associated elements may be omitted, if desired, but the use of these elements provides an additional safety feature at the drilling site.

From the foregoing it will be apparent that the present invention provides a novel hydraulic back-up system for the drum brakes of a drawworks at a well bore drilling site. The novel back-up system comprises hydraulic rams engagable with the equalizer beam normally provided in combination with the drawworks braking apparatus. The engagement of the rams with the equalizer beam maintains a neutral position for the beam whereby at least one brake will be operable for holding the entire load upon failure of the other of the dual brake system. The novel back-up system provides a safety feature for the overall braking system which has not been heretofore available.

Whereas the present invention has been described in particular relation to the drawings attached hereto, it should be understood that other and further modifications, apart from those shown or suggested herein may be made within the spirit and scope of this invention.

What is claimed is:

1. A hydraulic back-up system for a dual braking system having an equalizer beam in combination therewith, said back-up system comprising hydraulic ram means engagable with said equalizer beam for selectively maintaining a neutral position for the beam, and means operably connected with said hydraulic ram means for maintaining a hydraulic pressure thereagainst, wherein the last mentioned means comprises an air-over-oil intensifier operably connected with said ram means for hydraulic pressure communication therebetween, and means for providing air pressure to said intensifier for application of said hydraulic pressure communication with said ram means, and wherein said means for providing air pressure to said intensifier comprises pilot valve means operably connected with the air side of said intensifier, and actuator means secured to the equalizer beam for automatic actuation of said pilot valve means upon failure of one of the brakes of said dual braking system whereby said ram means engages said equalizer beam for providing said neutral position therefor.

2. A hydraulic back-up system as set forth in claim 1 and including crown brake chamber means operably connected with said air pressure providing means for actuation thereby.

3. A hydraulic back-up system as set forth in claim 1 wherein the ram means comprises a pair of spaced substantially identical hydraulic cylinders, each of said cylinders having a reciprocal ram member engagable with said equalizer beam for maintaining said neutral position therefor.

4. A hydraulic back-up system as set forth in claim 3 and including means providing a hydraulic communication between said cylinders whereby a fluid communication is provided between the cylinders.

5. A hydraulic back-up system as set forth in claim 4 and including shut-off valve means interposed in said hydraulic communication means to provide selective fluid communication between the cylinders.

* * * * *